Nov. 21, 1961  R. T. HENDRICKS  3,009,750
SERVICE TRAY
Filed Oct. 12, 1959
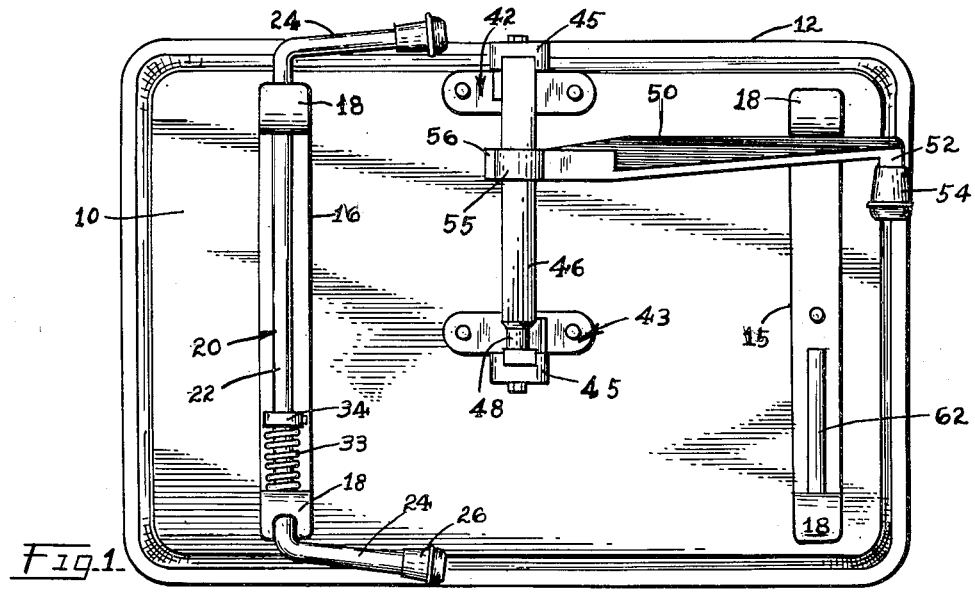
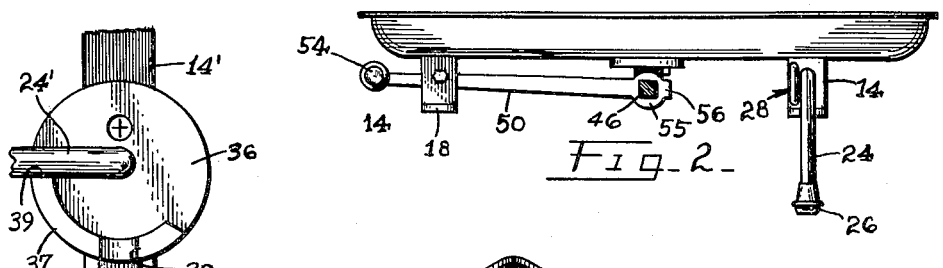
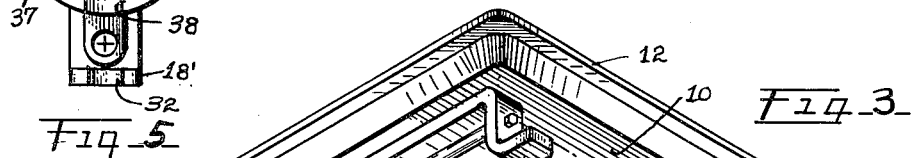
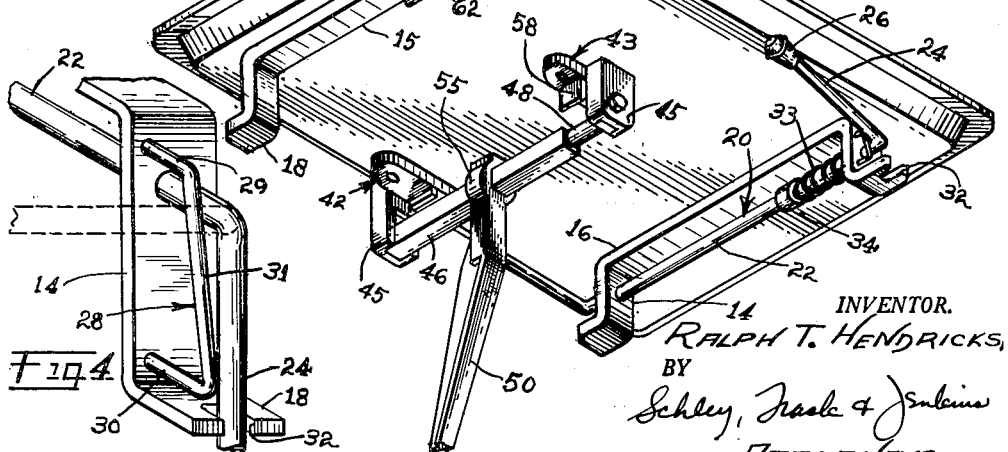
INVENTOR.
RALPH T. HENDRICKS,
BY
Schley, Haske & Jenkins
ATTORNEYS.

3,009,750
SERVICE TRAY

Ralph T. Hendricks, Indianapolis, Ind., assignor to The OP-AL Electric & Manufacturing Company, Inc., Indianapolis, Ind., a corporation of Indiana
Filed Oct. 12, 1959, Ser. No. 845,707
11 Claims. (Cl. 311—22)

This invention relates to a service tray for automobiles, and has for its objects the provision of an inexpensive service tray which is adapted to be used either inside or outside an automobile, which will be supported in a substantially level position in all of its positions of use, which can be quickly and easily converted for use either inside or outside an automobile, and whose supporting components may be releasably locked in their operative and retracted positions.

In accordance with the preferred form of my invention, there is provided a tray conveniently having an upturned peripheral edge and a plurality of downwardly extending legs adjacent each of its corners. Preferably, one pair of the depending legs provides a swingable support for a U-shaped leg frame having a pair of legs substantially longer than said downwardly extending legs. The leg frame is swingable with respect to the tray to dispose its legs in parallelism with the pair of downwardly extending legs at the opposite end of the tray so that the legs on said leg frame and the pair of legs at the opposite end of said tray act in combination to support the tray in a substantially level position on an automobile seat. Means are provided on one of the downwardly extending legs carrying the leg frame to releasably lock said leg frame in the desired position of adjustment.

Interposed between the downwardly extending legs on the underside of the tray is a brace support carrying a brace swingable between a retracted position in which it is disposed substantially parallel to the tray and an operative position normal to said tray in which it acts in combination with said leg frame and a pair of the downwardly extending legs hooked over the door window to hold the tray on the outside of an automobile door, said brace bearing against the door below said window. Means are also provided on said support to hold the brace in the desired position of adjustment.

The accompanying drawing illustrates my invention. In such drawing:

FIG. 1 is a bottom plan view of a service tray embodying my invention;

FIG. 2 is a side elevation of the tray shown in FIG. 1 with the supporting mechanism in position for supporting the tray on an automobile seat;

FIG. 3 is a perspective view of the tray shown in FIG. 1 with the supporting mechanism in position for supporting the tray on an automobile door;

FIG. 4 is a fragmentary end view of the leg frame locking mechanism; and

FIG. 5 is a fragmentary perspective view of a modified form of the leg frame locking mechanism.

As shown in the drawing, my invention comprises a supporting structure for a conventional curb service tray which may be used to support the tray in a substantially level position either on the outside of an automobile door or upon an automobile seat. The supporting structure also provides a support for supporting the tray on a level surface, as is normally required when such trays are being loaded or unloaded.

The conventional service tray 10 has a central dished portion bordered by a peripheral upstanding lip 12. To support such a tray in its several positions of use, I provide a supporting structure as shown in the drawing. Such a structure comprises a plurality of depending legs 14 mounted on the underside of the tray 10 adjacent the corners thereof. Conveniently, the legs 14 may constitute the downturned ends of a pair of brackets 15 and 16 mounted on the underside of the tray. As shown in FIG. 1, each of the legs 14 is provided with an outturned foot 18 parallel to the tray 10. The legs 14 are of the same length and are positioned substantially adjacent the corners of the tray whereby their feet 18 will support the tray in a level position on a level surface, such as is normally required when the tray is being loaded and unloaded.

In order to support the tray in a substantially level position when it is placed upon an inclined or tilted surface such as an automobile seat, I provide a generally U-shaped leg frame 20 having a bight portion 22 swingably and slidably carried in openings formed in the legs 14 of the bracket 16. The ends of the frame 20 constitute a pair of legs 24 disposed outside the extent of the feet 18 of the legs on the bracket 16 and having a length substantially greater than the two sets of legs 14 adjacent the corners of the tray 10. Conveniently, the ends of the of the frame legs 24 are provided with rubber caps 26.

The leg frame 20 is swingable with respect to the tray 10 between a retracted position in which its legs 24 are disposed against the lower face of said tray and an operative position in which the legs 24 are normal to said tray. To releasably lock the frame 20 in these two positions of adjustment, I mount a lock 28 on the outer face of one of the legs of the bracket 16. As shown in FIG. 4, the lock 28 is generally U-shaped and is provided with upper and lower outwardly projecting arms 29 and 30 of different lengths interconnected by a bight 31 which angles inwardly from the lower arm 30 to the upper arm 29, said lower arm 30 projecting outwardly from the leg 14 a distance at least equal to the length of its foot 18. Conveniently, the arms 29 and 30 are mounted on the bracket leg 14 in alignment with the inwardly disposed lateral edge of a groove 32 formed in the end of the foot 18 of the bracket leg upon which the lock is mounted. Thus, as the leg frame 20 is swung from the retracted dotted line position shown in FIG. 4 to its extended operative position shown in full lines, the leg 24 on the leg frame adjacent said lock will be cammed outwardly along the bight 31 of the lock until said leg is in a downwardly extending position in alignment with the edge of the lock 28 and the groove 32 formed in the foot 18. The leg frame is snapped into position in the groove 32 by a coil spring 33 received on the bight 22 of the leg frame and interposed between the inner face of the bracket leg carrying the lock 28 and a collar 34 fixedly mounted on the bight 22. Thus, the spring 33 exerts a biasing force against the collar 34 to urge the leg frame 20 toward the leg 14 carrying the lock 28 so that the leg 24 will be releasably retained in the groove 32 with the leg frame 20 lying in a plane normal to the plane of the tray. With the leg frame in this extended operative position, the legs on the bracket 15 may rest on the front edge of an automobile seat and the longer legs 24 on the leg frame 20 may be disposed on said seat adjacent the rear edge thereof. Thus, due to the tilt of the seat and the different lengths of the two sets of legs 24 and 14, the tray 10 will be supported in a substantially level position. By sliding the leg frame outwardly against the biasing force of the spring 33 and thus away from the leg bearing the lock 28, the frame leg 24 adjacent said lock may be disengaged from the groove 32 and the leg frame thus swung upwardly into a retracted position in which it is disposed against the bottom of the tray 10. The leg frame will be releasably held in this retracted position by the action of the spring holding the leg of said frame against the lock 28 adjacent the upper lock arm 29.

A modified form of my leg frame locking mechanism is illustrated in FIG. 5, wherein a lug 36 is mounted on the outer face of one of the legs 14'. As shown, the lug 36 has an outwardly projecting arcuate lip 37 provided with a groove 38 disposed in alignment with the groove 32' formed in the end of the foot 18' of the bracket leg upon which the lug is mounted, the grooves 38 and 32' being adapted to receive the adjacent leg 24' of the leg frame for holding the leg frame in an operative position normal to the tray for supporting said tray on the tilted surface of an automobile seat.

The lug 36 is also provided with a second groove 39 formed in the arcuate lip 38 and adapted to receive the adjacent leg 24' of the leg frame to hold said leg frame in retracted position adjacent the bottom of the tray. The leg frame is releasably held in its retracted position in the groove 39 or in extended position in the grooves 37 and 32' by the spring 33 in the same manner as previously described in connection with the preferred form of my locking mechanism.

To mount the tray on an automobile door, I mount a pair of brackets 42 and 43 on the lower face of the tray 10 conveniently adjacent the transverse axis of said tray. Each of the brackets 42 and 43 is provided with a depending ear 45 interconnected by a slide 46 having a square cross-section. The end of the slide 46 adjacent the depending ear 45 of the bracket 43 is of reduced size and has a circular cross-section, as indicated at 48 in FIG. 1.

As shown in FIG. 1, an elongated brace 50 having an inwardly bent end 52 conveniently provided with a rubber cap 54 is slidable on the slide 46. To this end, the end of the brace 50 opposite the end 52 is provided with an expanded head 55 having an opening extending therethrough. The opening in the brace head 55 has a square cross-section and is only slightly larger than the cross-section of the slide 46 to permit the head 54 and thus the brace 50 to be slid along the length of the slide 46 when the faces of said opening are parallel to the faces of the slide. As will be understood, the opening formed in the head 55 will permit the brace 50 to be rotated about the reduced diameter portion 48 of the slide 46 so that the brace may be swung from a retracted position in which it is disposed substantially parallel with the tray 10 to an extended operative position normal to said tray. Desirably, in order to prevent the brace from being swung in the direction of the leg frame 20 so that it may be moved to its fully collapsed position, the head 55 is provided with a lip 56 engageable with a rib 58 formed on the bracket 43 and offset slightly from the plane of the slide 46.

Thus, to move the brace into extended operative position, the brace is moved to a position in alignment with the reduced diameter portion 48 of the guide 46 and said brace is then rotated into a position normal to the tray 10. The lip 56 on the brace engages the rib 58 of the bracket 43 to prevent said brace from rotating past a position normal to the plane of the tray 10. With the brace 50 thus disposed in a position normal to the tray 10, it is slid outwardly on the slide 46 toward the bracket 42 until its inwardly bent end 52 is in the proper position to engage an automobile door below the window. The brace 50 is releasably retained in this operative position against the door by the faces of the opening formed in the head 55 engaging the abutting faces of the slide 46. Due to the opening in the head 55 being slightly larger than the cross-section of the slide 46, the brace 50 is swingable through a slight arc lying in the plane of the slide 46 so that the brace 50 is releasably locked in its desired operative position. Conveniently, a rod 62 parallel to the bight 22 of the leg frame 20 is mounted on a leg 14 of the bracket 15, and the tray is thus supported on the sill of the door window by the bight 22 of the leg frame and the rod 62 with a pair of the legs 14 being hooked over the window sill.

To move the brace 50 to its retracted position, the brace head 55 is slid inwardly along the slide 46 until the head is aligned with the reduced diameter portion 48 of said slide, and the brace is then rotated 90° until it is in parallelism with the bottom of the tray 10. The brace is then slid outwardly on the slide 46 toward the bracket 42 so that the abutting walls of the slide 46 and the opening formed in the brace head 55 will retain said brace in its retracted position.

While I have described the slide 46 and the opening in the head 55 as having square cross-sections, it is to be understood that they may have any desired configurations. It is only necessary that their faces be angulated to prevent the brace from swinging about the slide except on the reduced diameter portion 48 of said slide. The portion 48 of the slide may also have any desired cross-sectional configuration so long as it has a smaller cross-section than the opening in the brace head 55 to permit the brace head to be rotated thereon.

Thus, with both the brace 50 and the leg frame 20 in their retracted positions, the tray may be supported on the leg 14 in a level position on a level surface. To support the tray in a substantially level position on a tilted surface, such as an automobile seat, the leg frame 20 is merely swung downwardly to permit the tray to be supported on the longer legs 24 of the leg frame and the pair of shorter legs 14 on the bracket 15. And to support the tray on an automobile door, the rod 62 and the bight 22 of the leg frame are placed on the sill of the door window with a pair of the legs 14 hooked over said sill, and the brace 50 is swung downwardly and slid outwardly on the slide 46 until it is in the proper position to engage said door below the window.

I claim as my invention:

1. In a service tray, a tray, a pair of brackets mounted on the underside of said tray and having depending legs at their ends underlying said tray, a U-shaped leg frame swingably mounted on one of said pair of brackets and having legs substantially longer than the bracket legs, said leg frame being swingable into a position normal to the tray whereby the legs on said frame act in combination with the legs on the other of said pair of brackets to support the tray in a substantially level position on a tilted surface, means projecting inwardly from one of the legs on said other of said pair of brackets, and a brace mounted on the underside of said tray and swingable into a position normal to the tray whereby said brace acts in combination with a pair of said depending legs, said means, and the leg frame to support the tray on an automobile door, said means and leg frame being adapted to engage the sill of the door window and the brace being adapted to engage the door below said sill.

2. The invention as set forth in claim 1 in which said brace and leg frame are swingable to and from retracted positions adjacent the underside of the tray.

3. In a service tray, a tray, a depending leg mounted on the underside of the tray adjacent each of the corners thereof, each of said legs having an outwardly projecting foot generally parallel to the plane of the tray, a U-shaped leg frame having a bight swingably carried in a pair of said depending legs adjacent one end of the tray and a pair of legs substantially longer than the legs adjacent the tray corners, means on one of said legs in said depending pair of legs and its outwardly projecting foot for releasably locking said leg frame in a retracted position against the bottom of the tray and an operative position normal to the tray in which said leg frame acts in combination with the legs adjacent the opposite end of the tray for supporting the tray in a substantially level position on a tilted surface, and biasing means on said leg frame bight acting between said leg frame and said one of said pair of depending legs to releasably retain said leg frame in the desired position of adjustment.

4. The invention as set forth in claim 3 in which said means comprises a lug mounted on said one of said pair of depending legs carrying the leg frame and having a rib engageable with one of the legs on said leg frame, said rib having a pair of angular spaced grooves adapted to receive said one leg of the leg frame for releasably locking the leg frame in a retracted position against the bottom of the tray and an operative position normal to the tray, one of said grooves being in alignment with a groove formed in the foot on said one of said pair of depending legs carrying the leg frame, and said biasing means releasably retains said one leg of the leg frame in operative position in the pair of aligned grooves in said lug and foot.

5. The invention as set forth in claim 3 with the addition that said means comprises an angulated member projecting outwardly from said one of the pair of depending legs carrying the leg frame toward the foot on said one leg, the foot on said one leg being provided with a groove out of the plane of said angulated member for the reception of the adjacent leg on said leg frame for releasably retaining said leg frame in operative position, and said biasing means releasably retains said adjacent leg against said angulated member for releasably holding the leg frame in retracted position and in said groove for releasably holding the leg frame in extended operative position.

6. The invention as set forth in claim 5 in which said angulated member projects outwardly from said one leg a distance at least equal to the leg of the foot on said one leg.

7. In a service tray, a tray, a plurality of depending legs mounted on the underside of said tray adjacent the corners thereof, a pair of brackets mounted on the tray between said legs and interconnected by a slide parallel to said tray, said slide having a square cross-section along the major portion of its length and reduced diameter rounded cross-sectional portion adjacent one end thereof, and a brace carried on said slide having a head provided with an opening in which said slide is received for carrying said brace on the slide, said opening being only slightly larger than and having the same cross-sectional configuration as the major position of the slide whereby said brace will be slidable along the major portion of the slide and swingable and slidable on the reduced diameter portion of said slide.

8. The invention as set forth in claim 7 in which one of said pair of brackets is disposed adjacent the edge of the tray and the other of said brackets is disposed adjacent the center of said tray, the reduced diameter portion of said slide being disposed adjacent the bracket adjacent the center of the tray.

9. The invention as set forth in claim 8 in which the bracket adjacent the center of the tray is provided with means engageable with said brace to limit the swinging movement of the brace from a position in which the brace is disposed adjacent the lower face of the tray to a position in which said brace is normal to the plane of the tray.

10. In a service tray, a tray, a plurality of depending legs mounted on the underside of the tray adjacent the corners thereof, a first means mounted on the underside of said tray adjacent an end thereof and having a pair of retractable legs substantially longer than said depending legs, said retractable legs acting in combination with a pair of the depending legs for supporting the tray in a substantially level position on a tilted surface, and a second means swingably mounted on said tray between said depending legs and swingable into a position normal to the tray to act in combination with said first means and a pair of said depending legs for supporting the tray in a substantially level position on a car door.

11. The invention as set forth in claim 10 in which said first means is mounted on a pair of said depending legs, and locking means are provided on one of said pair of depending legs for releasably locking the retractable legs in the desired position.

References Cited in the file of this patent

UNITED STATES PATENTS

| | | |
|---|---|---|
| 2,049,386 | Temperli | July 28, 1936 |
| 2,246,432 | Cohen | June 17, 1941 |
| 2,697,018 | Georgides | Dec. 14, 1954 |
| 2,823,087 | Zimmer | Feb. 11, 1958 |
| 2,825,611 | Aynesworth | Mar. 4, 1958 |